Jan. 25, 1966  O. MUELLER  3,230,795

DIFFERENTIAL TRANSMISSION

Filed May 31, 1963  3 Sheets-Sheet 2

INVENTOR.
*OTTO MUELLER*
BY
*OLSEN & STEPHENSON*

Jan. 25, 1966   O. MUELLER   3,230,795
DIFFERENTIAL TRANSMISSION
Filed May 31, 1963   3 Sheets-Sheet 3

INVENTOR.
OTTO MUELLER
BY OLSEN & STEPHENSON 3,230,795
DIFFERENTIAL TRANSMISSION
Otto Mueller, 13 Byfield Lane, Dearborn, Mich.
Filed May 31, 1963, Ser. No. 284,646
12 Claims. (Cl. 74—711)

The present invention relates to a differential transmission adapted primarily, but not exclusively, for use with motor vehicles. In one of its preferred embodiments, the present invention relates to improvements in such a transmission having hydraulically actuated locking means, whereby a substantial driving torque is provided to both driven wheels of a vehicle even though one of the driven wheels has less traction than the other wheel.

As is well known, the conventional differential transmission heretofore used in the automobile industry has an inherent defect in that the driving torque is transmitted under certain circumstances wholly to the wheel of the vehicle which has the least traction. This loss of power to the other wheel occurs, for example, when the wheel with less traction is on ice, in mud, or the like where it can spin freely. Considerable efforts have been made for a number of years in the automobile industry to develop an improved differential transmission which can overcome this defect and which will provide controlled torque to both driven wheels while still assuring that proper differential action between the driven wheels will occur when required, but such efforts have not been entirely successful.

It is an object of the present invention to provide an improved differential transmission which includes means for controlling distribution to the driven wheels of the input torque to the differential transmission, such means being constructed and arranged to permit normal differential action when the relative rate of turning between the driven wheels is below a predetermined amount and which means functions when the relative rate of turning progressively increases above the predetermined amount to distribute torque progressively more evenly to the driven wheels.

It is another object of the present invention to provide an improved differential transmission of the foregoing character in which the means for controlling distribution of the input torque is a hydraulic mechanism which is adapted to use the fluid from the differential case for this purpose and which is adapted to replenish itself when required because of loss of fluid through leakage, or the like.

It is another object of the present invention to provide an improved differential transmission of the foregoing character which is constructed and arranged so that the hydraulic mechanism is operably disposed between one of the rotary differential elements and the case of the transmission, and the transmission is characterized by the effective and simple manner in which this mechanism is assembled as a part of the transmission.

It is still another object of the present invention to provide an improved differential transmission of the foregoing character in which the hydraulic mechanism is constructed and arranged so that it is statically and dynamically balanced to assure relatively long and trouble-free life of the transmission.

It is another object of the present invention to provide an improved differential of the foregoing character wherein the hydraulic mechanism controls the torque distribution as a function of the rate of displacement of hydraulic fluid within the mechanism, and which mechanism is characterized by the relatively small volume of fluid required for carrying out this function.

It is still another object of the present invention to provide an improved differential transmission of the foregoing character wherein an interchangeable flow control member is provided in the hydraulic mechanism for controlling the torque distribution.

It is another object of the present invention to provide an improved differential transmission which is constructed and arranged so that its external dimensions will conform generally to those of the prior conventional differential transmissions heretofore used, making it readily interchangeable with said prior transmissions, said improved differential transmission also being characterized by the simplicity of its construction so that it can be manufactured at a relatively low cost.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
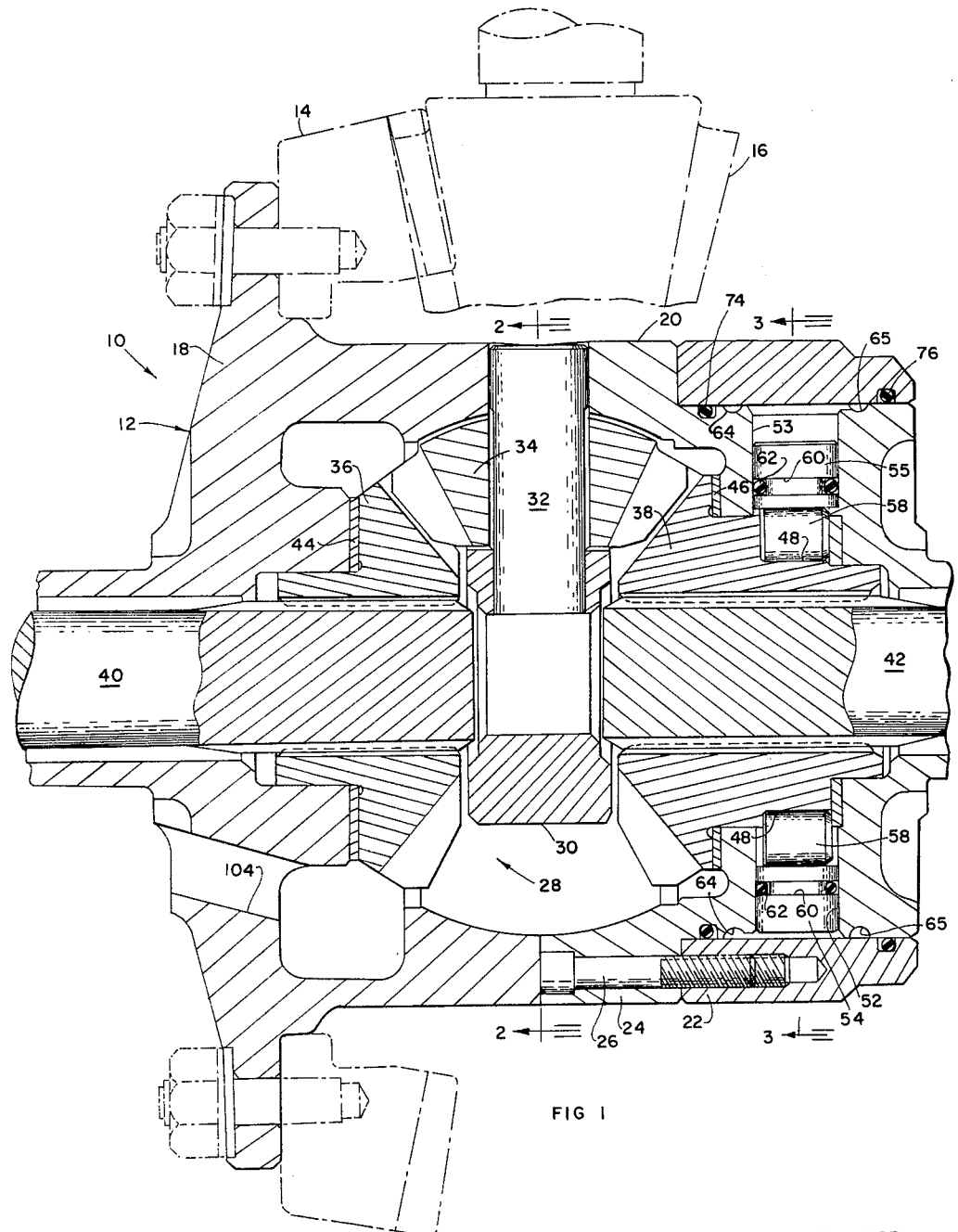
FIGURE 1 is a sectional view of a differential transmission embodying the present invention.

Referring to the drawings, the illustrated embodiment of the invention will now be described in greater detail. The differential transmission 10 has a case 12 which supports in the conventional manner a ring gear 14 which is adapted to be driven by a drive pinion 16. The differential case 12 is formed in two sections 18 and 20 which are secured together by a plurality of bolts 22. The section 18, forming one-half of the differential case 12, is of a conventional construction, but the other section 20, forming the other half of the differential case 12, is a two-part construction, one part of which is the annular retainer ring 22 which fits over the other part 24. As can be seen in FIGURE 1, the parts 22 and 24 are secured together by a plurality of bolts 26, one of which can be seen in this figure. With the exception of the two-part construction of the section 20, the outer configuration and dimensions of the differential case 12 are essentially the same as those of conventional differential transmissions heretofore used in the automobile industry.

Supported within the differential case 12 is a set of differential elements or gears 28 which is mounted within the differential case 12 for receiving the input torque received from the drive pinion 16. The differential gear set 28 includes a spider defined by the pinion shaft support 30 and the plurality of pinion shafts 32 which are mounted in the pinion shaft support 30. Mounted on the pinion shaft 32 for rotation are the pinion gears 34. Thus, by virtue of the manner in which the pinion shafts 32 tre mounted in the differential case 12, the complete spider assembly is adapted to rotate with the differential case 12, in the conventional manner.

Also forming a portion of the differential gear set 28 are the side gears 36 and 38 whose teeth are in mesh with the pinion gears 34. These side gears 36 and 38 also have internal splines for receiving the splined ends of the driven axle shafts 40 and 42, and conventional side gear thrust washers 44 and 46 are disposed between the side gears 36 and 38 and the differential case 12.

Figure 3:
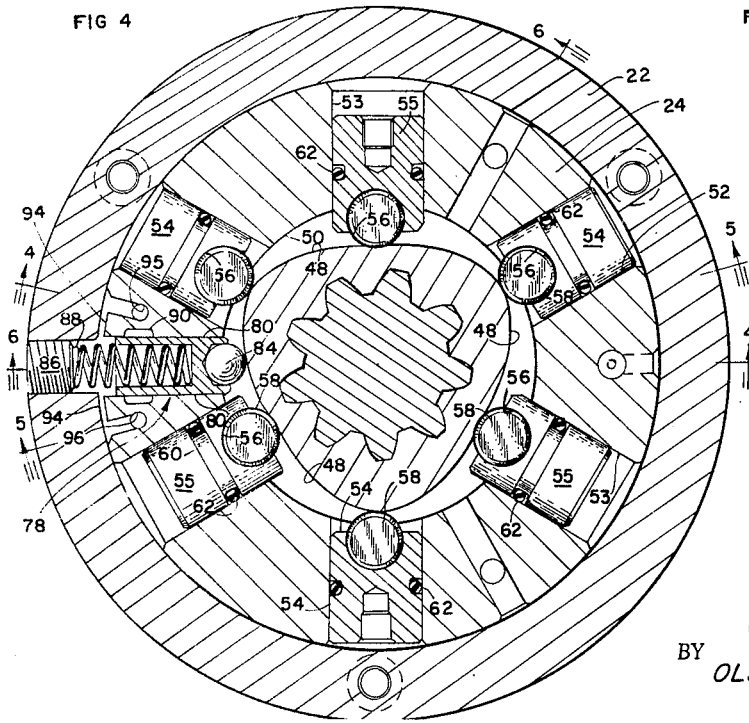
FIGURE 3 is a sectional view of the differential transmission, taken on the line 3—3 of FIGURE 1.

The side gear 36 and the pinion gears 34 are the conventional type heretofore used, but the side gear 38 has been modified to embody features of the present invention. As can be seen in FIGURES 1 and 3 of the drawings, the side gear 38 has a hub portion relatively longer than hub portions conventionally used, and around the periphery of the hub portion is a formed portion which defines a plurality of radially directed rise and fall cam surfaces 48. In the illustrated embodiment, three equiangular rise and fall portions are utilized. As can be seen best in FIGURE 3, the three portions are arranged so that they will provide both dynamic and static balance. The portion of the side gear 38 which contains the cam surfaces 48 is located radially inwardly of a complementary portion 50 in the case 12 in which are located a plurality of radially inwardly directed, circumferentially aligned pressure chambers 52 and 53 which are closed at their outer ends by the annular retainer ring 22. Located within the pressure chambers 52 and 53 are pistons 54 and 55 which are adapted respectively for reciprocation therein. The radially inner ends of the pistons 54 and 55 have transverse notches 56 therein in which are seated the followers or rollers 58. The latter are adapted to travel on the cam surfaces 48 for effecting reciprocal movement of the pistons 54 and 55. The pistons 54 and 55 have an annular groove 60 therein in which is seated on O ring 62 for maintaining a seal around the pistons 54 and 55 during their reciprocal movement.

Figures 4, 5:
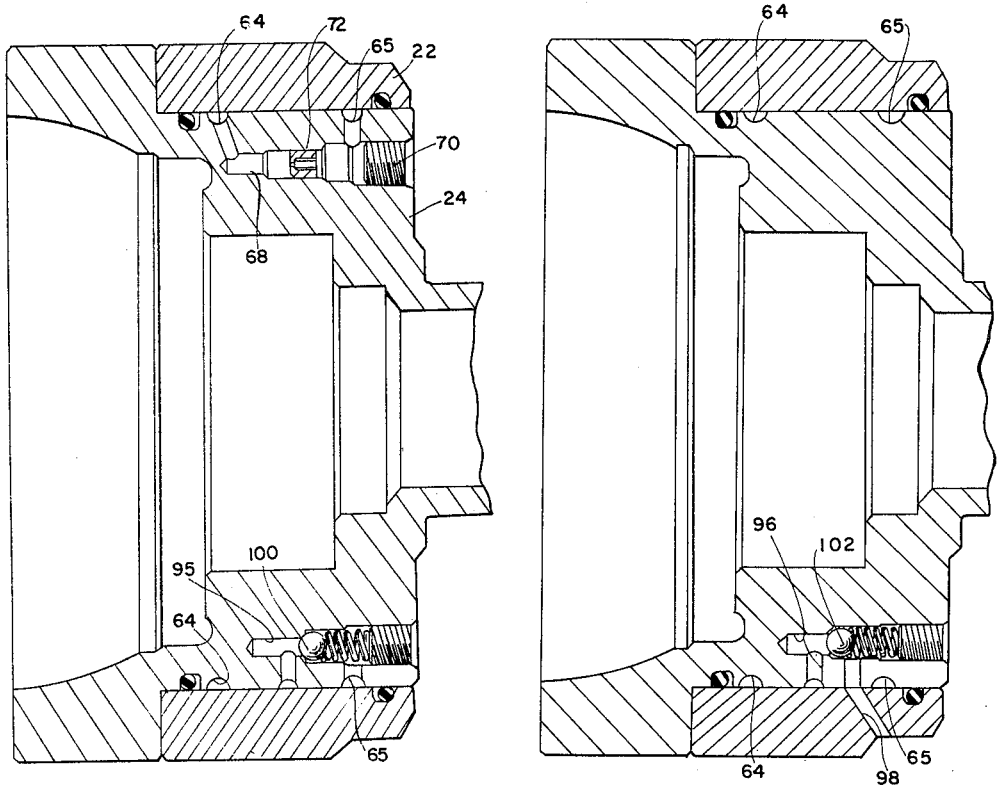
FIGURE 4 is a fragmentary sectional view of one-half of the case of the differential transmission, taken on the line 4—4 of FIGURE 3.
FIGURE 5 is another fragmentary sectional view of one-half of the case, taken on the line 5—5 of FIGURE 3.

Formed between the parts 22 and 24 of the differential case 12 are a pair of annular grooves 64 and 66 through which hydraulic fluid is adapted to flow. The duct 64 communicates with the pressure chambers 52, and the duct 66 communicates with the pressure chambers 53, and communication between the ducts 63 and 64 is effected by means of a transverse duct 68. The duct 68 can be seen best in FIGURE 4 where it is shown extending inwardly from one end of the part 24 with its one end closed by the plug 70. Located in the duct 68 is a fixed orifice flow control element 72 whose orifice is adapted to control the rate of flow of hydraulic fluid from one of the ducts 63, 64 to the other. By virtue of the passage means described, it is to be understood that a closed hydraulic circuit is provided between pressure chambers 52 and pressure chambers 53. Thus, when pistons 54 are at one end of their strokes, as shown in FIGURE 3, the hydraulic fluid in the closed system comprising the pressure chambers 52 and 53, and the ducts 64, 65 and 68 will be substantially all in such ducts and pressure chambers 53. Conversely, when side gear 38 has rotated 60 degrees relative to the differential case 12, the pistons 54 and the pistons 55 will have moved to the opposite ends of their strokes from the positions shown in FIGURE 3, resulting in the transfer of the hydraulic fluid from pressure chambers 53 to pressure chambers 54.

As is well known, so long as there is free relative rotation between the side gear 38 and the differential case 12, there will be unrestricted differential action permitted between axle shafts 40 and 42. However, if flow of the hydraulic fluid in the closed system, previously described, is restricted so that the pistons 54 and 55 cannot move freely, such differential action will be correspondingly restricted. The rate at which this differential action can occur is established by the flow control element 72. The greater the size of the orifice in flow control element 72, the greater will be the rate of transfer of the hydraulic fluid back and forth between the pressure chambers 52 and 53. From this it can be understood that the flow control element 72 can be properly dimensioned to permit free reciprocation of the pistons 54 and 55 up to a preselected extent of relative turning between the side gear 38 and the differential case 12. After this point has been reached, if greater differential action occurs between the side gear 38 and the differential case 12, the orifice in the flow control element 72 will restrict the flow of the hydraulic fluid sufficiently to limit correspondingly the rate of reciprocal movement of the pistons 54 and 55, and thereby restrict the relative turning that can occur between the side gear 38 and the differential case 12. When this action occurs, the input torque to the differential case 12 will be distributed more nearly equally to each of the driven shafts 40 and 42. It will be recognized by those skilled in the art, that for the purpose of carrying out this operation, the volume of fluids in the pressure chambers 52 and 54 can be relatively small, the essential feature being that the circuit is a closed one so that there will always be equal and opposite movement of the two sets of pistons 54 and 55 in response to any traveling of their respective rollers 58 on cam surfaces 48.

It will be understood that the fluid in the closed system will constantly be under pressure when differential action occurs between case 12 and the side gear 38, and therefore, it is necessary that effective seals be provided for the closed hydraulic system. For this purpose, the O rings 62 are provided in conjunction with the pistons 54 and 55, and O rings 74 and 76 are provided between parts 22 and 24 on opposite ends of the closed hydraulic system. It is preferred to locate the O ring 74 in a groove formed in the part 24, because this facilitates assembly of the part 22 on the part 24.

Figure 6:
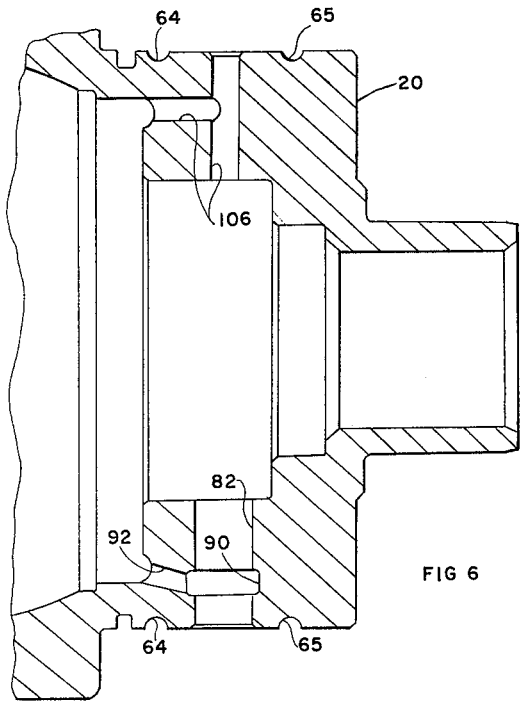
FIGURE 6 is another fragmentary sectional view, with parts removed, of one-half of the case, taken on the line 6—6 of FIGURE 3.
Figure 2:
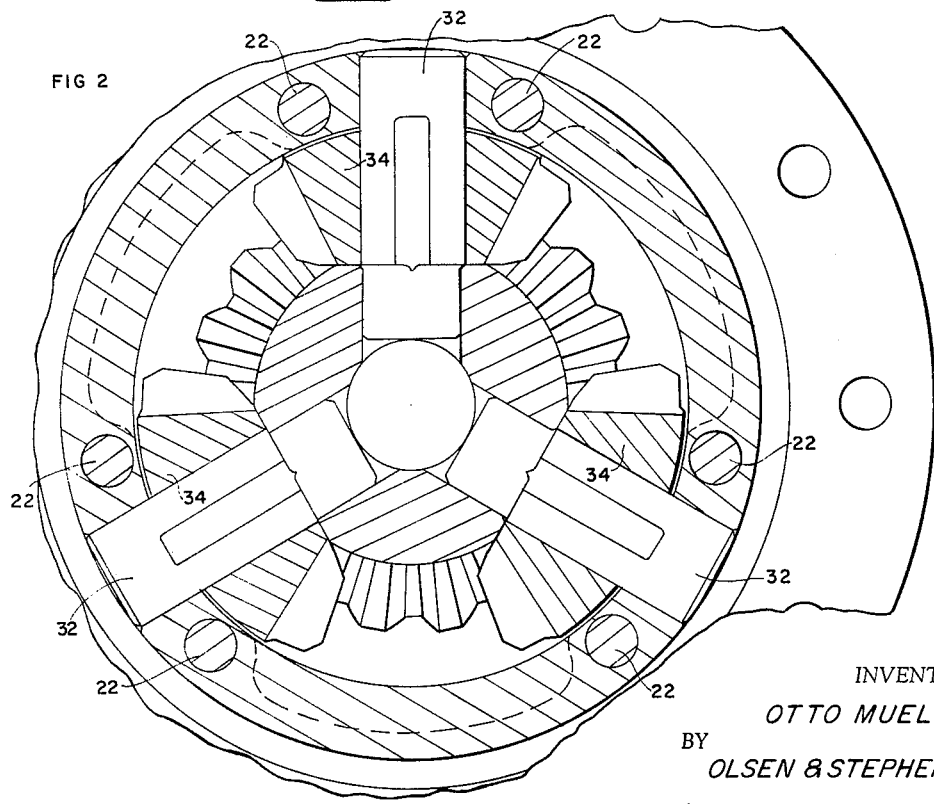
FIGURE 2 is a fragmentary sectional view of the differential transmission, taken on the line 2—2 of FIGURE 1.

It is recognized that the pressurized hydraulic fluid in the closed system may leak therefrom to a limited extent, and therefore, means are provided for replenishing such hydraulic fluid. This is accomplished by a replenishing pump 78 which is located in a bore extending axially inwardly through the parts 22 and 24, as can be seen best in FIGURE 3. As there shown, a piston 80 is adapted to reciprocate in the bore 82, and it carries a follower or ball 84 on its axially inner end which is adapted to travel on the cam surfaces 48. At the other end of the bore 82 is a plug 86 which serves to retain a compression spring 88 against the piston 80 to urge the latter constantly against the cam surfaces 48. When the piston 80 is at one end of its stroke, the port 90 will be in communication with the interior of the chamber in which the piston 80 reciprocates, and, as can be seen in FIGURE 6, the port 90 is in communication with a duct 92 which is in communication with the interior of the differential case 12. Thus, when the piston 80 moves to the one end of its stroke, suction will occur, drawing hydraulic fluid from the interior of the differential case 12 into the interior of the chamber in which the piston 80 is adapted to reciprocate. When the piston moves to the opposite end of its stroke, against the pressure of the spring 88, the port 90 will be closed forcing the trapped fluid out of the replenishing pump 78 via the duct 94 to the ducts 95 and 96, shown best in FIGURES 4 and 5. Duct 95 is in fluid communication with the annular passageway for duct 65, and duct 96 is in fluid communication with the exterior of the differential case 12 by means of the duct 98. A ball check valve 100 is in the duct 95 to prevent return of hydraulic fluid from the annular duct 63 to the pump 78, and similarly, a by-pass or ball check valve 102 is in the duct 96 to provide one-way flow of hydraulic fluid, caused by operation of the pump 78, from the closed hydraulic system to the exterior of the differential case 12.

From the foregoing description, it is believed to be readily understood that the replenishing pump 78 functions during such time when there is relative rotation between the side gear 38 and the differential case 12 to pump hydraulic fluid from the interior of the differential case 12 into the closed hydraulic system comprising the pressure chambers 52 and 53 and their communicating passage means. So long as the hydraulic system is filled with hydraulic fluid, the operation of the pump 78 will serve merely to pass hydraulic fluid from the interior of the differential case 12 through the by-pass valve 102 and out the passageway or duct 98 to the exterior of the differential case. Fluid within the differential case 12 is always maintained because of the port or passageway 104 therein which, when in the position shown in FIGURE 1, will be below the normal level of the hydraulic fluid that is present in the housing (not shown) for the differential transmission 10.

In order to assure proper lubrication of the cam followers or rollers 58, suitable lubrication ducts 106, FIGURE 6, are provided in the part 20.

It is believed that the operation of the present invention is now fully understood. In summary, substantially equal portions of the input torque to the differential case 12 will be distributed to the axle shafts 40 and 42 when the driven wheels (not shown) have equal traction. If one of the wheels loses its traction and begins to spin relative to the other wheel, the side gear 38 will turn relative to the differential case 12, causing reciprocation of pistons 54 and 55. However, the rate of such reciprocation will be restricted by the rate at which hydraulic fluid can pass through the orifice in flow control element 72. This has the effect of partially restricting reciprocation of pistons 54 and 55, which thereby restricts free relative turning between side gear 38 and differential case 12. When so restricted, portions of the input torque will be distributed via side gears 36 and 38 to each of the driven wheels. However, normal and desired differential action can be obtained when turning corners, or the like, because under such conditions the relative rate of turning between the differential case 12 and side gear 38 is small.

Having described my invention, I claim:

1. A differential transmission comprising a casing for transmitting an input torque, a set of differential gears mounted in said casing for receiving the input torque, said set of differential gears including a pair of side gears adapted to be connected to a pair of axle shafts, one of said side gears having radially directed rise and fall cam surfaces around its circumference, said casing having a plurality of radially inwardly opening pressure chambers facing said cam surfaces and adapted to contain a fluid, pistons in said pressure chambers operatively engaging said cam surfaces for reciprocating in response to rotation of said one side gear relative to said casing, said pressure chambers and said cam surfaces being arranged so that certain of said pistons reciprocate one hundred eighty degrees out of phase with other of said pistons during said relative rotation of said one side gear with respect to said casing, and passage means providing restricted fluid communication between the pressure chambers containing said certain pistons and the pressure chambers containing said other pistons.

2. A differential transmission comprising a casing for transmitting an input torque and adapted to contain a fluid, a set of differential gears mounted in said casing for receiving the input torque, said set of differential gears including a pair of side gears adapted to be connected to a pair of axle shafts, one of said side gears and said casing having radially facing circumferential portions, one of said portions including a plurality of radially opening pressure chambers facing the other portion and adapted to contain fluid, the other of said portions including radially directed rise and fall cam surfaces, pistons in said pressure chambers operatively engaging said cam surfaces for reciprocating in response to rotation of said one side gear relative to said casing, said pressure chambers and said cam surfaces being arranged so that certain of said pistons reciprocate one hundred eighty degrees out of phase with other of said pistons during said relative rotation of said one side gear with repsect to said casing, passage means providing restricted fluid communication between the pressure chambers containing said certain pistons and the pressure chambers containing said other pistons, and pump means in said one portion in communication with said pressure chambers and responsive to movement of said cam surfaces for pumping fluid from said casing to said pressure chambers.

3. A differential transmission comprising a casing for transmitting an input torque and adapted to contain a fluid, a set of differential gears mounted in said casing for receiving the input torque, said set of differential gears including a pair of side gears adapted to be connected to a pair of axle shafts, one of said side gears having three radially directed rise and fall cam surfaces uniformly spaced around its circumference, said casing having six uniformly spaced circumferentially aligned radially inwardly opening pressure chambers facing said cam surfaces and adapted to contain fluid, three alternate ones of said pressure chambers comprising one set of pressure chambers and the remaining three alternate pressure chambers comprising another set of pressure chambers, pistons in said pressure chambers operatively engaging said cam surfaces for reciprocating in response to rotation of said one side gear relative to said casing, and passage means providing restricted fluid communication between the two sets of pressure chambers.

4. A differential transmission comprising a casing for transmitting an input torque and adapted to contain a fluid, a set of differential gears mounted in said casing for receiving the input torque, said set of differential gears including a pair of side gears adapted to be connected to a pair of axle shafts, one of said side gears having three radially directed rise and fall cam surfaces uniformally spaced around its circumference, said casing having six uniformally spaced circumferentially aligned radially inwardly opening pressure chambers facing said cam surfaces and adapted to contain fluid, three alternate ones of said pressure chambers comprising one set of pressure chambers and the remaining three alternate pressure chambers comprising another set of pressure chambers, pistons in said pressure chambers operatively engaging said cam surfaces for reciprocating in response to rotation of said one side gear relative to said casing, passage means providing fluid communication between the two sets of pressure chambers, and flow control means in said passage means for controlling the rate of fluid flow between said sets of pressure chambers.

5. A differential transmission as claimed in claim 4 including pump means in communication with said pressure chambers and responsive to action of the transmission for urging fluid from said casing to said pressure chambers for replenishing losses of fluid from said pressure chambers or said passage means.

6. A differential transmission comprising a rotatable casing for transmitting an input torque, a set of rotatable differential elements mounted in said casing, one of the rotatable elements of said set having a plurality of dynamically and statically balanced circumferentially arranged and radially outwardly directed rise and fall cam surfaces, said casing having means defining a plurality of circumferentially aligned and radially inwardly directed pressure chambers arranged relative to the axis of the casing for static and dynamic balance and facing said cam surfaces and adapted to contain fluid, said pressure chambers numbering twice the cam surfaces and comprising two sets, one set being alternate ones of said pressure chambers and the other set being the other alternate ones of said pressure chambers, pistons in said pressure chambers operatively engaging said cam surfaces for reciprocation in response to rotation of said one element relative to said casing, passage means providing fluid communication between said two sets of pressure chambers, and flow control means in said passage means for controlling the rate of fluid flow between said sets of pressure chambers.

7. A differential transmission comprising a rotatable casing for transmitting an input torque, a set of rotatable differential elements mounted in said casing, one of the rotatable elements of said set having a plurality of circumferentially arranged and radially outwardly directed rise and fall cam surfaces, said casing having means defining a plurality of circumferentially aligned and radially inwardly directed pressure chambers facing said cam surfaces and adapted to contain fluid, said pressure chambers being in two sets, restricted passage means providing fluid communication between the two sets of pressure chambers, pistons in said pressure chambers operatively engaging said cam surfaces for reciprocation in response to rotation of said one element relative to said casing, said pressure chambers and said cam surfaces being arranged so that when relative rotation occurs between said casing and said one element the pistons reciprocate to transfer the fluid in the pressure chambers back and forth therebetween via said passage means.

8. A differential transmission comprising a casing for transmitting an input torque, said casing having an end portion through which extend a plurality of radially arranged pressure chambers and a retainer ring portion enclosing said end portion and the radially outer ends of said pressure chambers, a set of differential gears mounted in said casing for receiving said input torque, said set of differential gears including a pair of side gears adapted to be connected to a pair of axle shafts, one of said side gears having radially directed rise and fall cam surfaces around its circumference facing the radially inner ends of said pressure chambers, a plurality of pistons adapted to follow on said cam surfaces and extending into the radially inner ends of said pressure chambers for reciprocation in response to rotation of said casing relative to said one side gear, said end portion and said retainer ring portion defining between them a pair of annular ducts one of which is in communication with certain of said pressure chambers and the other of which is in communication with the other of said pressure chambers, and flow control means in fluid communication with said ducts and operable to control the rate of flow of fluid reciprocating between said pair of annular ducts and their associated pressure chambers as a result of said pistons reciprocating on said cam surfaces.

9. A differential transmission comprising a casing for transmitting an input torque and adapted to contain a fluid, said casing having an end portion through which extend a plurality of radially arranged pressure chambers and a retainer ring portion enclosing said end portion and the radially outer ends of said pressure chambers, a set of differential gears mounted in said casing for receiving said input torque, said set of differential gears including a pair of side gears adapted to be connected to a pair of axle shafts, one of said side gears having radially directed rise and fall cam surfaces around its circumference facing the radially inner ends of said pressure chambers, a plurality of pistons adapted to follow on said cam surfaces and extending into the radially inner ends of said pressure chambers for reciprocation in response to rotation of said casing relative to said one side gear, said end portion and said retainer ring portion defining between them a pair of annular ducts one of which is in communication with certain of said pressure chambers and the other of which is in communication with the other of said pressure chambers, and flow control means in fluid communication with said ducts and operable to control the rate of flow of fluid reciprocating between said pair of annular ducts and their associated pressure chambers as a result of said pistons reciprocating on said cam surfaces, and pump means in said end portion in communication with said ducts and responsive to movement of said cam surfaces for pumping fluid from said casing to said ducts.

10. A differential transmission comprising a casing for transmitting an input torque and adapted to contain a fluid, said casing having a plurality of radially arranged pressure chambers, a set of differential gears mounted in said casing for receiving said input torque, said set of differential gears including a pair of side gears adapted to be connected to a pair of axle shafts, one of said side gears having radially directed rise and fall cam surfaces around its circumference facing the radially inner ends of said pressure chambers, a plurality of pistons adapted to follow on said cam surfaces and extending into the radially inner ends of said pressure chambers for reciprocation in response to rotation of said casing relative to said one side gear, means defining a pair of annular ducts one of which is in communication with certain of said pressure chambers and the other of which is in communication with the other of said pressure chambers, flow control means in fluid communication with said ducts and operable to control the rate of flow of fluid between said pair of annular ducts and their associated pressure chambers, pump means in communication with said ducts and operable to pump fluid from said casing to said ducts, and by-pass means for returning surplus fluid pumped to said ducts by said pump means.

11. A differential transmission comprising a casing for transmitting an input torque, a set of differential gears mounted in said casing for receiving the input torque, said set of differential gears including a pair of side gears adapted to be connected to a pair of shafts, one of said side gears and said casing having operatively disposed thereon oppositely arranged radially facing circumferential portions, one of said portions including a plurality of radially opening pressure chambers facing the other portion and adapted to contain a fluid, the other of said portions including radially directed rise and fall cam surfaces, pistons in said pressure chambers operatively engaging said cam surfaces for reciprocating in response to rotation of said one side gear relative to said casing, said pressure chambers being in two sets, restricted passage means providing fluid communication between the two sets of pressure chambers, said pressure chambers and said cam surfaces being arranged so that when relative rotation occurs between said casing and said one element the pistons reciprocate to transfer the fluid in the pressure chambers back and forth therebetween via said passage means.

12. A differential transmission as claimed in claim 11 wherein the circumferential portion containing said cam surfaces is disposed for rotary travel with said side gear.

References Cited by the Examiner
UNITED STATES PATENTS

| | | | |
|---|---|---|---|
| 2,808,739 | 10/1957 | Mueller | 74—711 |
| 2,861,477 | 11/1958 | Mueller | 74—711 |
| 2,978,929 | 4/1961 | Roberts | 74—711 |
| 3,015,970 | 1/1962 | Mueller | 74—711 |

DON A. WAITE, *Primary Examiner.*